United States Patent [19]

Sato et al.

[11] Patent Number: 5,693,436
[45] Date of Patent: Dec. 2, 1997

[54] METHOD FOR FORMING A COLOR FILTER

[75] Inventors: Morimasa Sato; Takekatsu Sugiyama, both of Shizuoka, Japan

[73] Assignee: Fuji Photo Film Co., Ltd., Kanagawa, Japan

[21] Appl. No.: 569,840

[22] Filed: Dec. 8, 1995

[30] Foreign Application Priority Data

Dec. 8, 1994 [JP] Japan .................. 6-304925

[51] Int. Cl.$^6$ ........................ G02B 5/20
[52] U.S. Cl. ........................ 430/7; 430/321
[58] Field of Search ........... 430/7, 321; 359/67, 359/68; 349/106, 110

[56] References Cited

U.S. PATENT DOCUMENTS 5,489,621  2/1996  Sato et al. .................. 522/75

FOREIGN PATENT DOCUMENTS

| 3-209203 | 9/1991 | Japan . |
| 4-69602 | 3/1992 | Japan . |
| 4-179955 | 6/1992 | Japan . |
| 6-059119 | 3/1994 | Japan . |

*Primary Examiner*—John A. McPherson
*Attorney, Agent, or Firm*—Sughrue, Mion, Zinn, Macpeak & Seas, PLLC

[57] ABSTRACT

A method for forming a color filter comprising the steps of providing a transparent substrate having a frontside and a backside, the frontside having thereon a multicolored pattern comprising areas having colored picture elements and areas that are free of the colored picture elements; forming a light-shielding photosensitive resin layer on the transparent substrate to thereby cover the multicolor pattern; exposing the light-shielding photosensitive resin layer to actinic rays through the backside of the transparent substrate, to thereby harden those portions of the light-shielding photosensitive resin layer which do not overlay the colored picture elements; and developing the light-shielding photosensitive resin layer to form light-shielding picture elements on those areas of the substrate which do not have the colored picture elements, wherein the colored picture elements of the multicolored pattern contain a compound represented by formula (I):

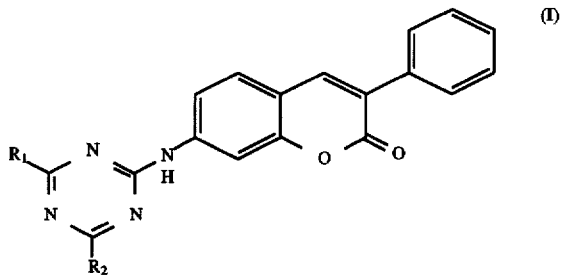

and $R_1$ and $R_2$ are as defined herein.

7 Claims, No Drawings

METHOD FOR FORMING A COLOR FILTER

FIELD OF THE INVENTION

The present invention relates to a method for forming a color filter for use in a liquid crystal display and the like. More specifically, the present invention relates to a method for forming patterned picture elements having a light-shielding property.

BACKGROUND OF THE INVENTION

A color filter used in a full color liquid crystal display comprises R, G and B picture elements and patterned light-shielding picture elements provided between the colored picture elements, to thereby prevent leakage of light and improve contrast.

The light-shielding picture elements are formed of a dispersion material of a black dye in a metal film such as chromium or in a photosensitive resin. In the case of a metal film such as chromium, the metal film is deposited over the entire surface of a glass board by means of vapor evaporation and a resist is then coated thereon, followed by patterning and etching to pattern the metal film. The above described process is very complicated, the yield is low, and the process is disadvantage in terms of its production cost. Another known method for forming patterned picture elements having a light-shielding property uses a photosensitive black resin which is a combination of a photosensitive resin and carbon. In this case, the film must have a thickness of several μm so as to achieve a certain degree of light-shielding property. Furthermore, because the patterned picture elements having a light-shielding property are somewhat superposed on R, G and B picture elements due to alignment error, the color filter thus formed usually has an uneven surface. In order to obtain good flatness, a flattening layer may be further provided on the color filter, or the color filter may be subjected to surface polishing.

To solve these problems, JP-A-3-209203 (the term "JP-A" as used herein means an "unexamined published Japanese patent application") and JP-A-4-69602 disclose a method where a black photosensitive layer is coated over the entire filter surface after forming R, G and B picture elements thereon and the substrate is exposed through the back surface thereof to form patterned picture elements having a light-shielding property in the gaps between the R, G and B picture elements. However, according to this method, it is very difficult to coat a black photosensitive layer between the respective R, G and B picture elements and over the entire surface of the support so that the photosensitive layer has the same thickness as that of the R, G or B elements. Furthermore, when a liquid crystal panel is produced using a color filter prepared according to the above-described method, problems arise in that the cell gap is not uniform and the display is uneven.

SUMMARY OF THE INVENTION

A first object of the present invention is to provide a method for forming a color filter having good flatness over its entire surface and light-shielding pattern picture elements.

A second object of the present invention is to provide a simple method for forming patterned picture elements having a high light-shielding property and also good accuracy.

The above objects of the present invention are achieved by a method for forming a color filter comprising:

providing a transparent substrate having a frontside and a backside, the frontside having thereon a multicolored pattern comprising areas having colored picture elements and areas that are free of the colored picture elements;

forming a light-shielding photosensitive resin layer on the transparent substrate to thereby cover the multicolor pattern;

exposing the light-shielding photosensitive resin layer to actinic rays through the backside of the transparent substrate, to thereby harden those portions of the light-shielding photosensitive resin layer which do not overlay the colored picture elements; and developing the light-shielding photosensitive resin layer to form light-shielding picture elements on those areas of the substrate which do not have the colored elements, wherein the colored picture elements of the multicolored pattern contain a compound represented by formula (I):

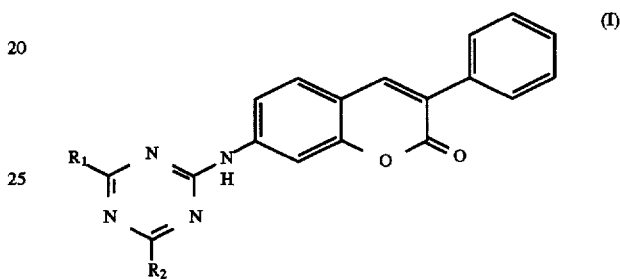

wherein $R_1$ represents an amino group substituted by at least one hydroxyalkyl group or $R_1$ represents a group represented by the following formula (II); the hydroxyalkyl group preferably has from 1 to 10 carbon atoms, and may be substituted by an alkyl, aryl, alkoxy or aryloxy group preferably having from 1 to 10 carbon atoms;

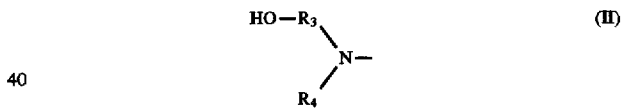

(wherein $R_3$ represents an alkylene group which may be substituted and preferably has from 1 to 10 carbon atoms, $R_4$ represents a hydrogen atom, an alkyl, aralkyl, aryl, alkoxyalkyl, aralkyloxyalkyl or aryloxyalkyl preferably having from 1 to 10 carbon atoms or a group represented by the formula HO—$R_3$—, and $R_3$ and $R_4$ may form a 5- or 6-membered heterocyclic ring including the nitrogen atom shown in formula (II)); and $R_2$ represents a hydrogen atom, an alkyl, aralkyl, aryl, alkoxy, aralkyloxy or aryloxy group preferably having from 1 to 10 carbon atoms, a halogen atom, an amino group or a group represented by $R_1$, and when $R_2$ is an amino group substituted by at least one hydroxyalkyl group represented by $R_1$, $R_1$ and $R_2$ may be the same or different.

Examples of the substituted alkylene group represented by $R_3$ include the following groups.

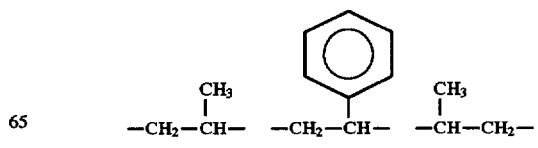

-continued

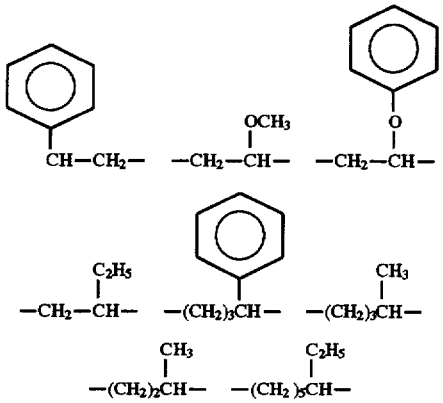

DETAILED DESCRIPTION OF THE INVENTION

The present invention is described below in detail below.

A multicolor pattern comprising the three primary colors of light, namely, R, G and B picture elements, formed on a transparent substrate, may be prepared by known methods such as a dyeing method, a printing method, a pigment dispersion method, an electrodeposition process or a transfer method. Examples of the transparent substrate for use in the present invention include those described in U.S. Pat. No. 5,298,360.

When the light transmittance of R, G and B picture elements in the wavelength region to which the light-shielding photosensitive resin is sensitive exceeds 2%, a light absorbent is preferably added beforehand to the R, G and B picture element coating solutions so as to reduce the light transmittance of the resulting colored picture elements to 2% or less. In the present invention, the light absorbent that is used for this purpose is the coumarin-based compound represented by formula (I) above. This compound has good light absorption, exhibits a light absorption capability of 25% or more even after heat treatment at 200° C. or higher and, in case of forming a multicolor pattern using a photopolymerizable composition, this compound does not inhibit photopolymerization.

The above-described heat treatment at 200° C. or higher is carried out, as desired, to further harden the patterned picture elements in forming a color filter.

Specific examples of the coumarin compound represented by formula (I) are set forth below, but the compound represented by formula (I) for use in the present invention should not be construed as being limited to these compounds.

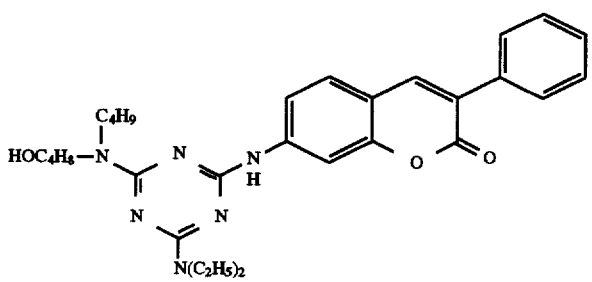

Compound 1

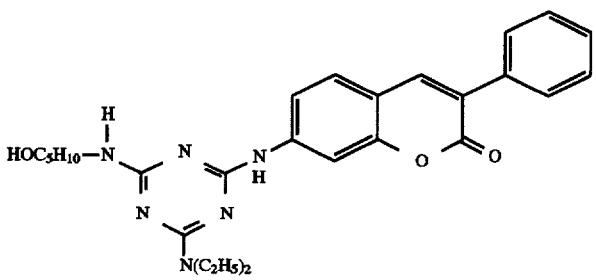

Compound 2

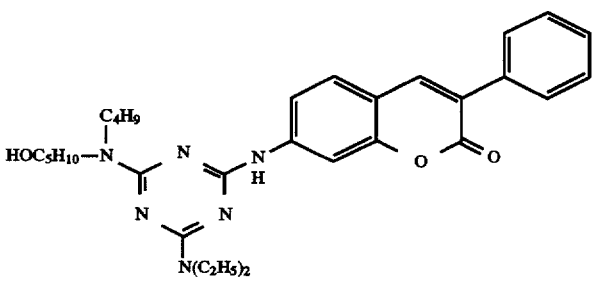

Compound 3

-continued
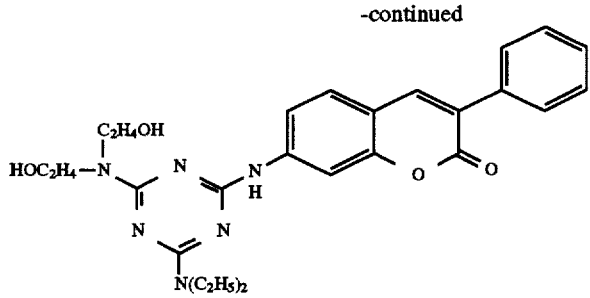
Compound 4
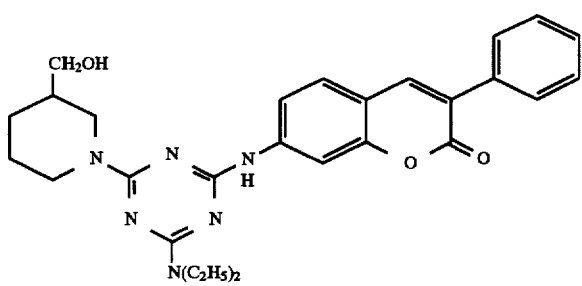
Compound 5
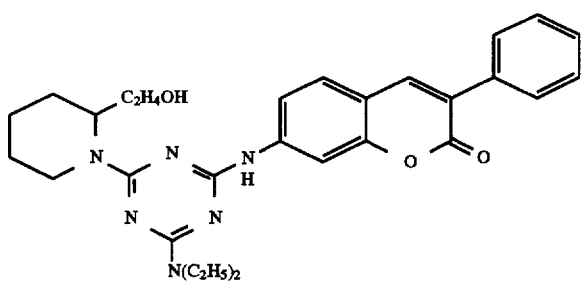
Compound 6
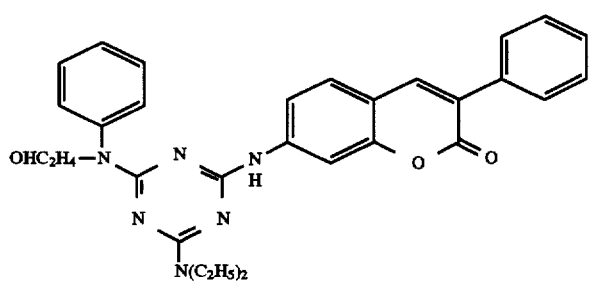
Compound 7
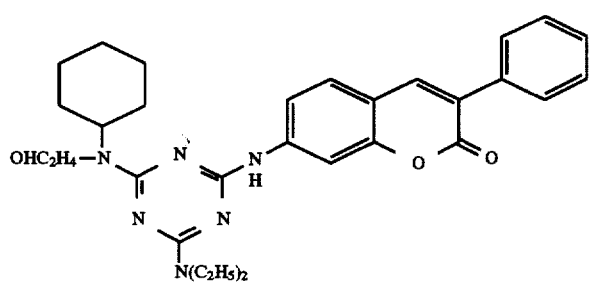
Compound 8
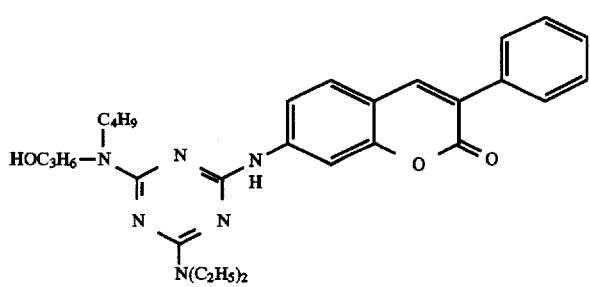
Compound 9

-continued
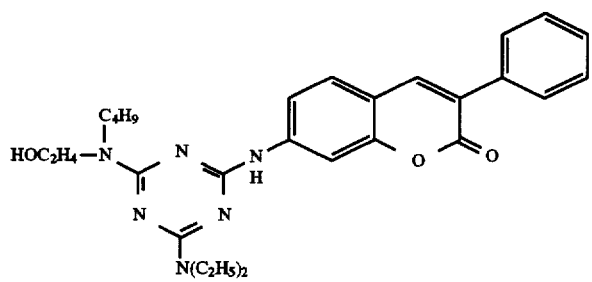
Compound 10
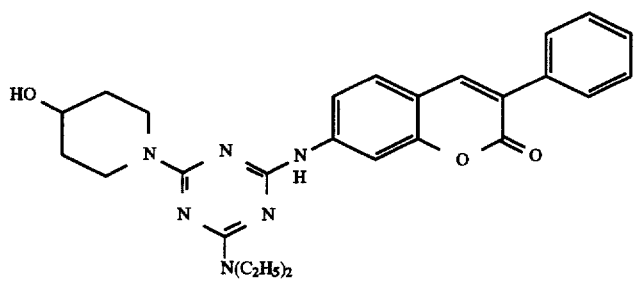
Compound 11
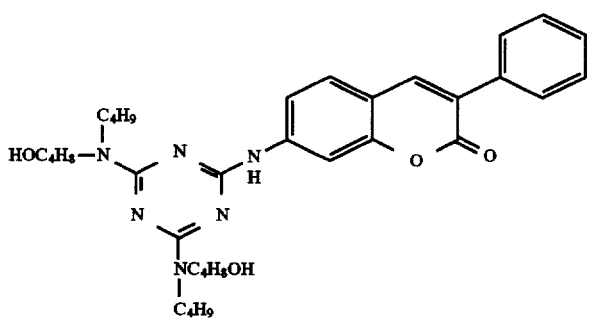
Compound 12
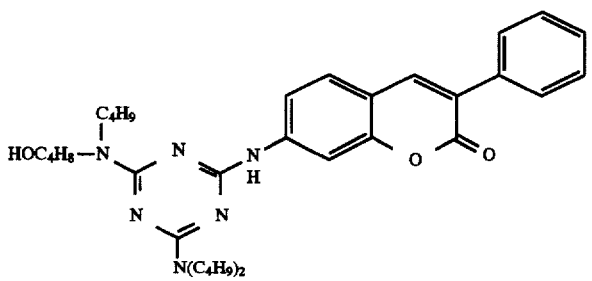
Compound 13
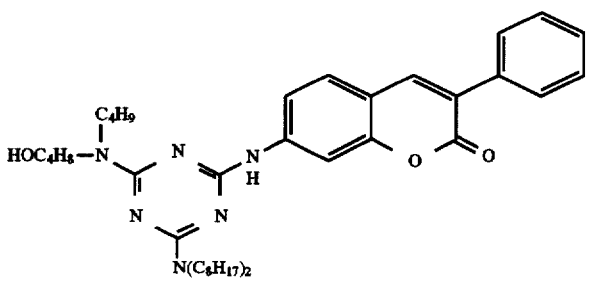
Compound 14

-continued
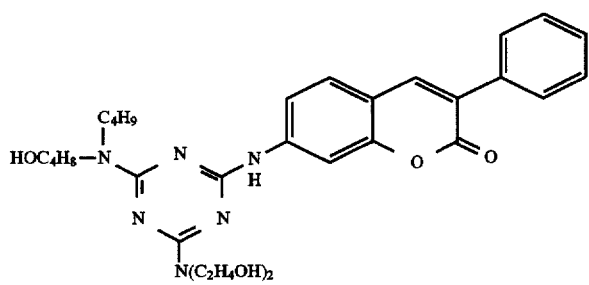
Compound 15
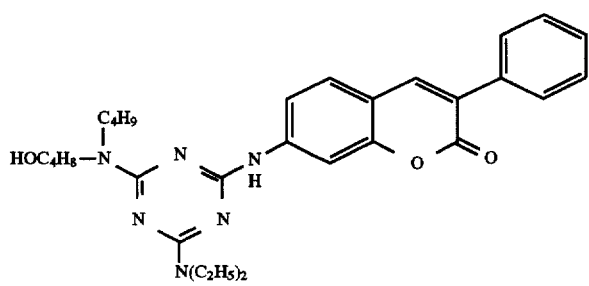
Compound 16
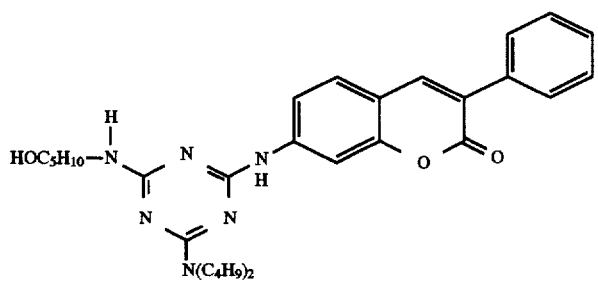
Compound 17
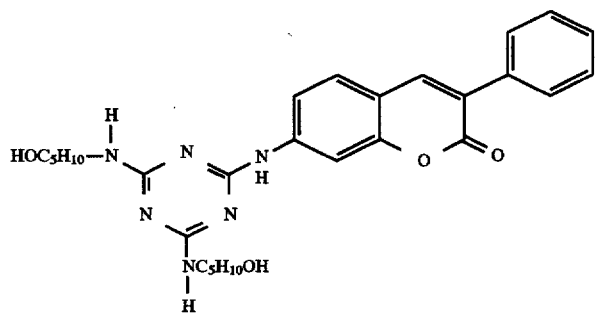
Compound 18
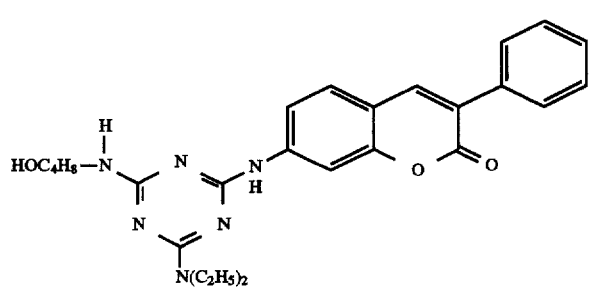
Compound 19

-continued
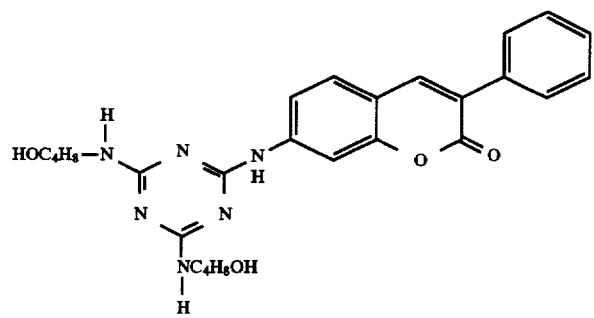
Compound 20
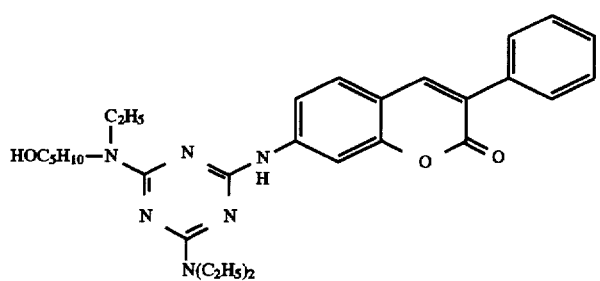
Compound 21
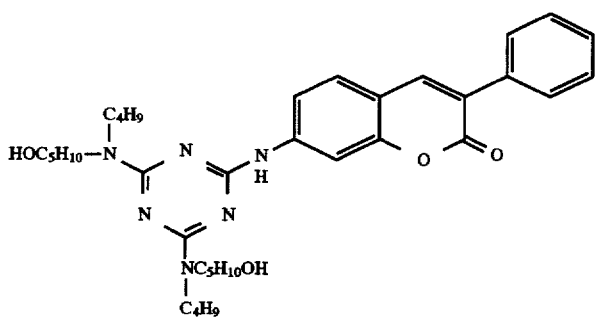
Compound 22
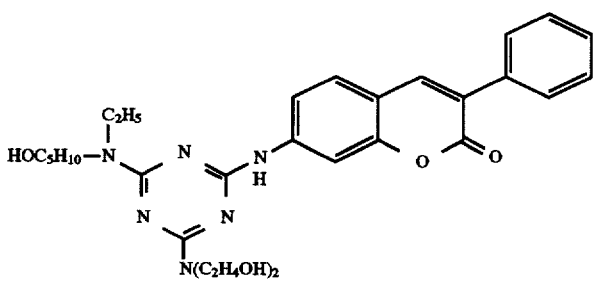
Compound 23
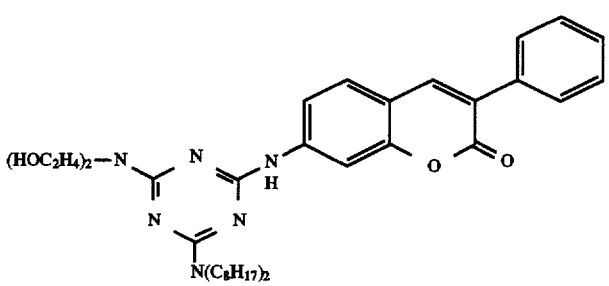
Compound 24

Compound 25
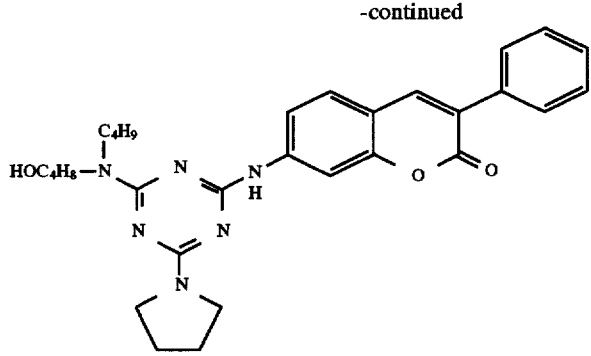
Compound 26
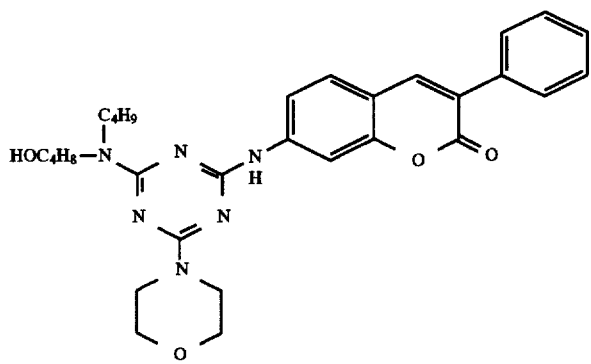
Compound 27
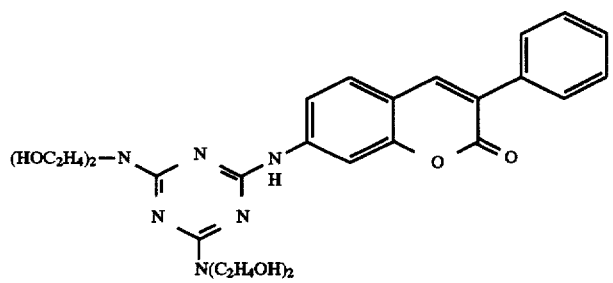
Compound 28
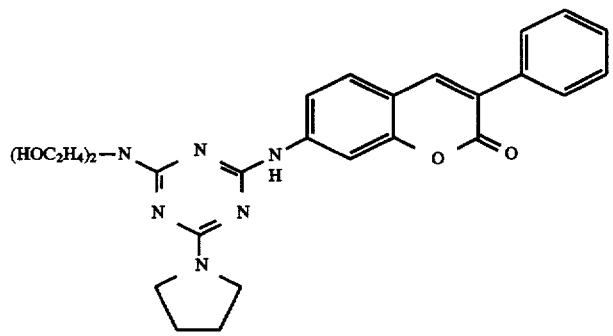
Compound 29
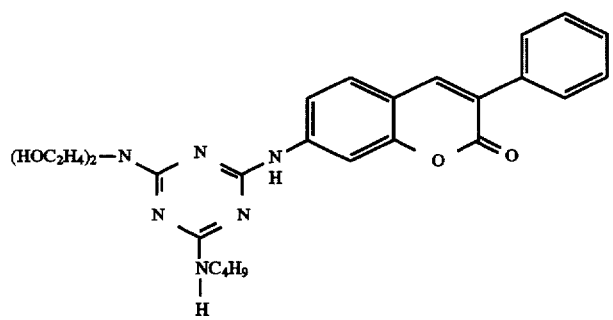

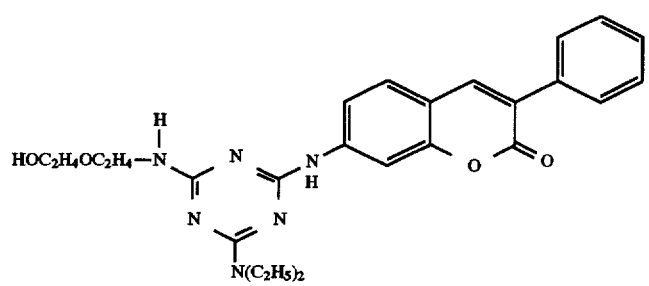
Compound 30
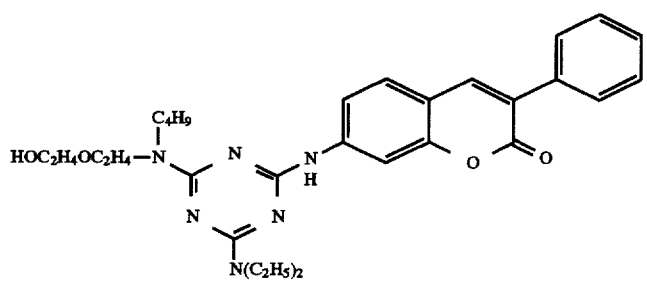
Compound 31
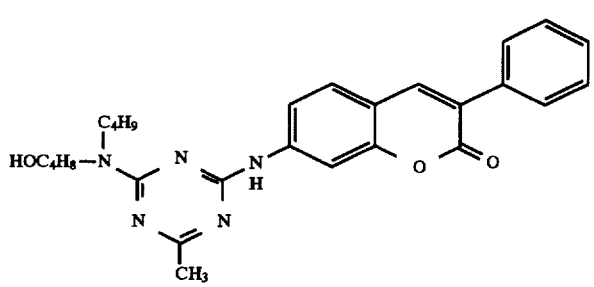
Compound 32
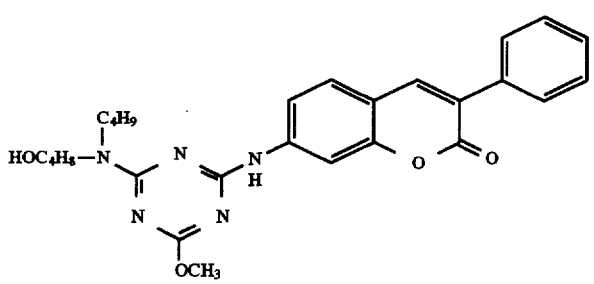
Compound 33
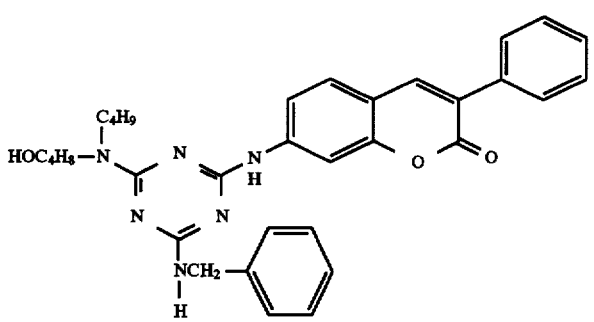
Compound 34

-continued
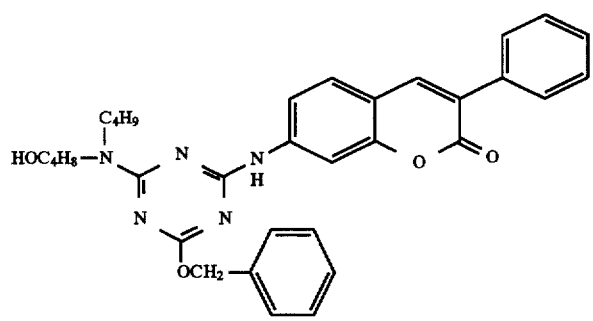
Compound 35
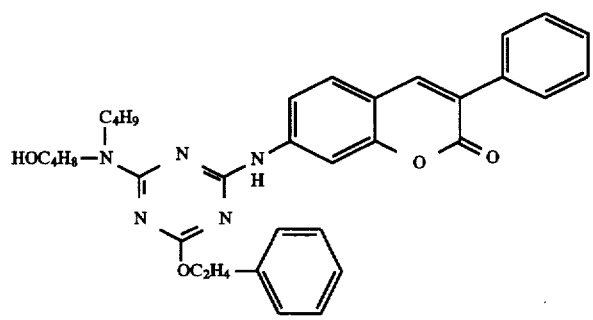
Compound 36
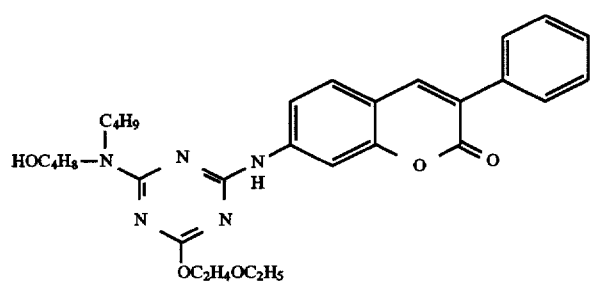
Compound 37
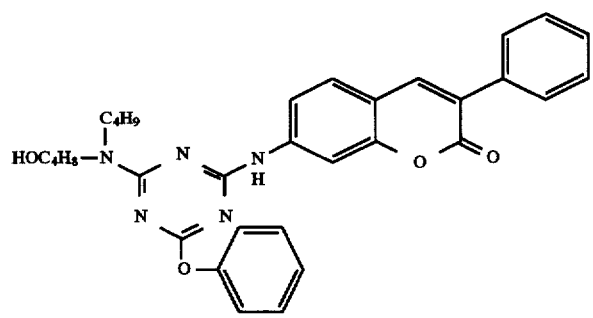
Compound 38
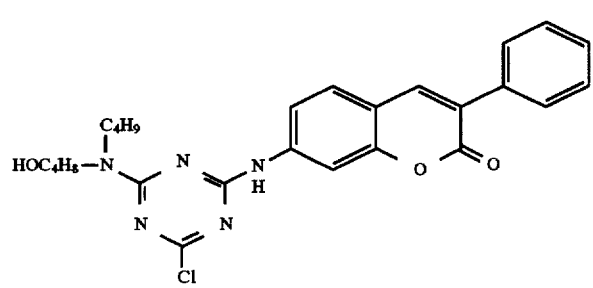
Compound 39

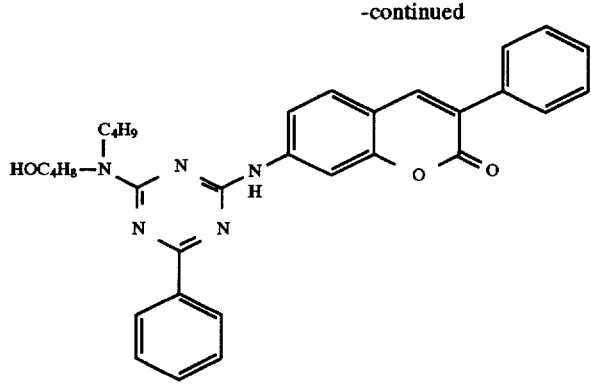

Compound 40

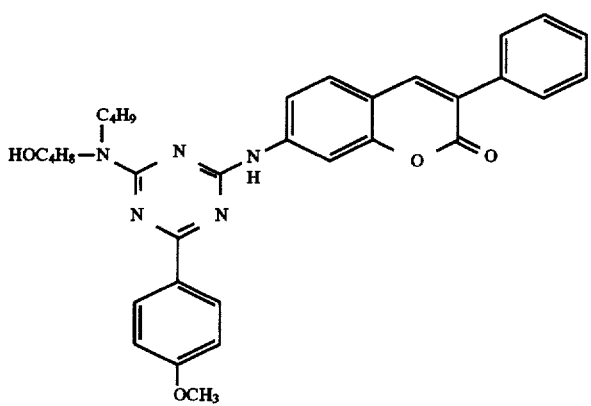

Compound 41

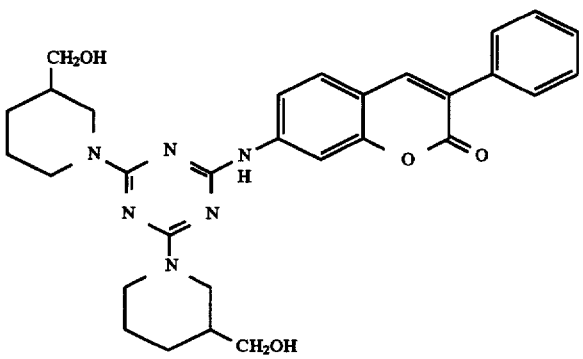

Compound 42

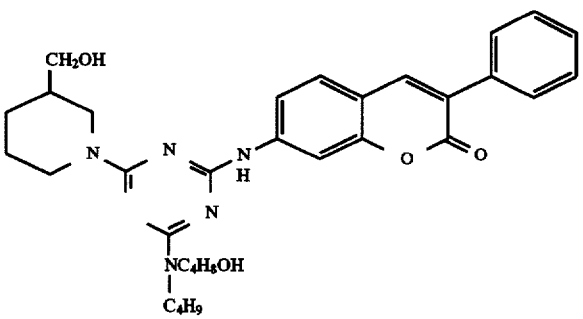

Compound 43

Among these compounds, Compounds 1 to 5 are preferred because they have a light-absorption capability exceeding 70% even after heat treatment at 200° C. or higher.

The transfer material, the transfer method and the image-forming method (such as a development process) for use in the present invention in forming a light-shielding photosensitive resin layer which covers the color filter, include various materials and techniques known in the art. Namely, a transfer material comprising a separation layer which weakly adheres to a temporary support, and a photosensitive resin layer and an image-formation method using this material are described in U.S. Pat. No. 5,298,360; a photosensitive transfer material comprising a temporary support having thereon a thermoplastic resin layer, an interlayer and a photosensitive resin layer where the adhesion between the temporary support and the thermoplastic resin layer is lowest among these layers, and an image forming method using this material are disclosed in U.S. Pat. Nos. 5,397,678 and 5,409,800; a transfer material comprising a thermoplastic resin layer, a separation layer and a photosensitive resin layer where the adhesion between the thermoplastic resin layer and the separation layer is lowest among these layers, and an image forming method using this material are disclosed in U.S. Pat. No. 5,292,613; a photosensitive transfer material comprising a temporary support having thereon a thermoplastic resin layer, an interlayer and a photosensitive resin layer where the adhesion between the temporary support and the thermoplastic resin layer is lowest among these layers, and an image forming method using this material are disclosed in U.S. Pat. No. 5,294,516; and a light-shielding photosensitive resin composition containing two or more coloring agents and a method for forming a light-shielding image is described in JP-A-7-28236 (U.S. patent application No. 08/241,571).

In carrying out exposure through a transparent substrate (called back exposure), the light source is selected to match the photosensitive property of the light-shielding photosensitive resin layer. Known light sources such as an extra-high pressure mercury lamp, a xenon lamp, a carbon arc lamp or an argon laser lamp may be used.

However, if the light transmittance of the R, G and B picture elements in the wavelength region to which the light-shielding photosensitive resin layer is sensitive exceeds 2%, and when patterned picture elements having a light shielding property are formed such that the optical density (OD) thereof is 1.5 or higher, the photocured shielding film may remain on the R, G and B picture elements to render practical use thereof as a color filter difficult.

Accordingly, the compound represented by formula (I) is preferably added in an amount so as to reduce the light transmittance of the R picture element to 2% or less. The addition amount of the compound represented by formula (I) is generally from 0.1 to 30% by weight based on a colored photosensitive layer for R picture element.

Also, a desired wavelength region may be selected using an optical filter. In this case, the optical filter preferably only passes light in the wavelength region where the light transmittance of the R, G and B picture elements in the wavelength region to which the light-shielding photosensitive resin layer is sensitive is 2% or less.

The above-described two techniques may be used in combination.

According to the above described method, the light-shielding photosensitive resin layer transferred onto each of the R, G and B picture elements is not substantially hardened upon exposure through the substrate, and the resin layer is easily removed from these areas in the subsequent development process.

The present invention will be described in greater detail with reference to the following Examples, however, the present invention should not be construed as being limited thereto.

EXAMPLES 1 TO 43

A coating solution comprising the following Formulation H1 was coated on a 100 µm-thick polyethylene terephthalate film as a temporary support, and dried to form a thermoplastic resin layer having a dry thickness of 20 µm. Formulation H1 for Thermoplastic Resin Layer:

| | |
|---|---|
| Methyl methacrylate/2-ethylhexyl acrylate/benzyl methacrylate/methacrylic acid copolymer (copolymer composition ratio (by mol) = 55/30/10/5; weight average molecular weight = 50,000) | 15.0 parts by weight |
| Polypropylene glycol diacrylate (average molecular weight = 822) | 6.5 parts by weight |
| Tetraethylene glycol dimethacrylate | 1.5 parts by weight |
| p-Toluenesulfonamide | 0.5 part by weight |
| Benzophenone | 1.0 part by weight |
| Methyl ethyl ketone | 30.0 parts by weight |

Thereafter, a coating solution comprising the following Formulation B1 was coated on the above described thermoplastic resin layer and dried to form an interlayer having a release property and a dry thickness of 1.6 µm. Formulation B1 for Interlayer:

| | |
|---|---|
| Polyvinyl alcohol (PVA205, produced by Kuraray Co., Ltd.; saponification rate = 80%) | 130 parts by weight |
| Polyvinyl pyrrolidone (PVP, K-90, produced by GAF Corporation) | 60 parts by weight |
| Fluorine-based surface active agent (Surflon S-131, produced by Asahi Glass Co., Ltd.) | 10 parts by weight |
| Distilled water | 3,350 parts by weight |

On the temporary support having thereon the thermoplastic resin layer and the interlayer prepared as described above, a coating solution comprising the following Formulation C1 was coated and dried to form a light-shielding photosensitive resin layer having a dry thickness of 2 µm. Formulation C1:

| | |
|---|---|
| Benzyl methacrylate/methacrylic acid copolymer (molar ratio = 70/30; limiting viscosity number [η] = 0.12) | 30.00 parts by weight |
| Pentaerythritol tetraacrylate | 7.40 parts by weight |
| Michler's ketone | 0.04 part by weight |
| 2-(o-Chlorophenyl)-4,5-diphenylimidazole dimer | 0.40 part by weight |
| Carbon black | 3.80 parts by weight |
| Hydroquinone monomethyl ether | 0.01 part by weight |
| Methyl cellosolve acetate | 280.00 parts by weight |
| Methyl ethyl ketone | 140.00 parts by weight |

Furthermore, a polypropylene covering sheet (thickness: 12 µm) was attached under pressure onto the above described light-shielding photosensitive resin layer to prepare a light-shielding photosensitive transfer material. The resulting light-shielding photosensitive layer was sensitive to a wavelength range of from 350 to 420 nm. When an extra-high pressure mercury lamp was used as a light source, its main sensitive wavelength was 365 nm (i-ray) and 405 nm (h-ray), and the OD of the light-shielding photosensitive layer was 2.0 (as determined by a Macbeth densitometer).

Also, coating solutions for colored photosensitive red (R), blue (B) and green (G) layers each having the composition shown in Table 1 below were prepared.

TABLE 1

Formulation of Coating Solution for Colored Photosensitive Layer

| | R Layer | G Layer | B Layer |
|---|---|---|---|
| Benzyl methacrylate/ methacrylic acid copolymer (molar ratio = 73/27; limiting viscosity number [η] = 0.12) | 60.0 | 60.0 | 60.0 |
| Pentaerythritol tetraacrylate | 43.2 | 43.2 | 43.2 |
| Michler's ketone | 2.4 | 2.4 | 2.4 |
| 2-(o-Chlorophenyl)diphenyl- imidazole dimer | 2.5 | 2.5 | 2.5 |
| Irgazin Red BPT (red) | 5.4 | — | — |
| Sudan Blue (blue) | — | 5.2 | — |
| Copper phthalocyanine (green) | — | — | 5.6 |
| Carbon black (black) | — | — | — |
| Methyl cellosolve acetate | 560 | 560 | 560 |
| Methyl ethyl ketone | 280 | 280 | 280 |

Compounds 1 to 43 represented by formula (I) were separately added to the above-described coating solution for R layer in an amount such that the i-ray transmittance of the R Layer became 0.5%, to thereby prepare the coating solutions for R layer of Examples 1 to 43, respectively.

First, using the coating solution for R layer containing Compound 1, a color filter comprising a glass substrate (thickness: 1.1 mm) having thereon R, G and B picture elements was prepared as follows.

Transfer materials for R, G, B layers were prepared with the above described coating solution in the same manner as for the light-shielding photosensitive transfer material described above.

The covering sheet of the transfer material for R layer was peeled off, and the photosensitive resin layer surface was laminated to a glass substrate using a laminator (VP-II, manufactured by Taisoi Laminator Co., Ltd.) under pressure (0.8 kg/cm$^2$) and heating (130° C.). Then, the temporary support and the thermoplastic resin layer were peeled apart at the interface therebetween to remove the temporary support.

Thereafter, the laminate was exposed through a photo mask using an extra-high pressure mercury lamp, and developed with an aqueous solution of 1% sodium carbonate to remove the unhardened parts, to thereby form R picture element on the glass substrate.

Successively, G and B picture elements were, respectively, formed on the glass substrate in the same manner as described above to form a color filter of Example 1.

The transmittances at the i-ray and the h-ray are shown in Table 2 below.

TABLE 2

| | Transmittance (%) | |
|---|---|---|
| | i-ray | h-ray |
| R Layer | 0.5 | 1 |
| G Layer | 0.5 | 0.8 |
| B Layer | 0.2 | 30 |

The covering sheet of the light-shielding photo-sensitive transfer material was peeled off, and the light-shielding photosensitive resin layer surface was laminated to the multicolor pattern surface of the multicolor pattern comprising R, G and B picture elements using a laminator (VP-II, manufactured by Taisei Laminator Co., Ltd.) under pressure (0.8 kg/cm$^2$) and heating (130° C.). Then, the temporary support and the thermoplastic resin layer were peeled apart at the interface therebetween to remove the temporary support.

Thereafter, the entire surface of the laminate was exposed through the glass substrate using an extra-high pressure mercury lamp. In this case, because the h-ray transmittance of the B picture element exceeded 2% as shown in Table 2, a Toshiba Glass Filter (UVD36c) was placed between the light source and the glass substrate. The exposure intensity was 100 mj/cm$^2$.

Then, the laminate was developed with an aqueous solution of 1% sodium carbonate to remove the unhardened parts and to form patterned picture elements having a light-shielding property between the respective R, G and B picture elements. The finished color filter of Example 1 had good flatness and was free of superposition of patterned picture elements having a light-shielding property on the R, G and B picture elements. Furthermore, the light-shielding photosensitive resin layer was substantially completely removed from over the R, G and B picture elements in the development step.

The same steps were repeated using coating solutions containing Compounds 2 to 43 to prepare the color filters of Examples 2 to 43, respectively. About the same good results as in Example 1 were also obtained for the color filter of Examples 2 to 43.

COMPARATIVE EXAMPLE 1

A color filter was prepared in the same manner as in Example 1, except that the Toshiba Glass Filter (UVD36c) was not placed in the exposure path. In this case, the light-shielding photosensitive resin layer remained on the B picture element, and the resulting color filter was not practically useful.

COMPARATIVE EXAMPLE 2

A multicolor R, G and B pattern was formed on a glass substrate (thickness: 1.1 mm) using coating solutions for colored photosensitive layers of red (R), blue (B) and green (G) each having the composition shown in Table 1 of Example 1. These solutions did not contain a compound of formula (I) of the invention. The resulting transmittances at the i-ray and the h-ray are shown in Table 3 below.

TABLE 3

| | Transmittance (%) | |
|---|---|---|
| | i-ray | h-ray |
| R Layer | 4 | 1 |
| G Layer | 0.5 | 0.8 |
| B Layer | 0.2 | 30 |

A light-shielding photosensitive resin layer was provided on the multicolor pattern prepared as described above using the same light-shielding transfer material as in Example 1, exposed at an intensity of 100 mj/cm$^2$ through a Toshiba Glass Filter (UVD36c) and then developed with an aqueous solution of 1% sodium carbonate to remove the unhardened parts and thereby form patterned picture elements having a light-shielding property between respective R, G and B picture elements. In this case, because the i-ray transmittance of the R picture element exceeded 2%, the light-shielding layer remained on the R picture element, to thereby result in a color filter failure.

EXAMPLE 44

A coating solution comprising the following Formulation H1 was coated on a 100 μm-thick polyethylene terephthalate film as a temporary support and dried to form a thermoplastic resin layer having a dry thickness of 20 μm. Formulation H1 for Thermoplastic Resin Layer:

| | |
|---|---|
| Methyl methacrylate/2-ethyl-hexyl acrylate/benzyl methacrylate/methacrylic acid copolymer (copolymer composition ratio (by mol) = 55/30/10/5; weight average molecular weight = 50,000) | 15.0 parts by weight |
| Polypropylene glycol diacrylate (average molecular weight = 822) | 6.5 parts by weight |
| Tetraethylene glycol dimethacrylate | 1.5 parts by weight |
| p-Toluenesulfonamide | 0.5 part by weight |
| Benzophenone | 1.0 part by weight |
| Methyl ethyl ketone | 30.0 parts by weight |

Thereafter, a coating solution comprising the following Formulation B1 was coated on the above described thermoplastic resin layer, and dried to form an interlayer having a dry thickness of 1.6 μm. Formulation B1 for Interlayer:

| | |
|---|---|
| Polyvinyl alcohol (PVA205, produced by Kuraray Co., Ltd.; saponification rate = 80%) | 130 parts by weight |
| polyvinyl pyrrolidone (PVP, K-90, produced by GAF Corporation) | 60 parts by weight |
| Fluorine-based surface active agent (Surflon S-131, produced by Asahi Glass Company, Ltd.) | 10 parts by weight |
| Distilled water | 3,350 parts by weight |

On the temporary support having thereon the thermoplastic resin layer and the interlayer provided as described above, a coating solution comprising the following Formulation C2 was coated and dried to form a light-shielding photosensitive resin layer having a dry thickness of 2 μm. Formulation C2:

| | |
|---|---|
| Benzyl methacrylate/methacrylic acid copolymer (molar ratio = 70/30; limiting viscosity number [η] = 0.12) | 30.00 parts by weight |
| Pentaerythritol tetraacrylate | 7.40 parts by weight |
| Michler's ketone | 0.04 part by weight |
| 2-(o-Chlorophenyl)-4,5-diphenylimidazole dimer | 0.40 part by weight |
| Carbon black | 2.80 parts by weight |
| Hydroquinone monomethyl ether | 0.01 part by weight |
| Methyl cellosolve acetate | 280.00 parts by weight |
| Methyl ethyl ketone | 140.00 parts by weight |

Furthermore, a polypropylene covering sheet (thickness: 12 μm) was attached under pressure onto the above described light-shielding photosensitive resin layer to prepare a light-shielding photosensitive transfer material. The resulting light-shielding photosensitive layer was sensitive to a wavelength range of from 350 to 420 nm. Furthermore, when an extra-high pressure mercury lamp was used as a light source, its main sensitive wavelength was 365 nm (i-ray) and 405 nm (h-ray) and the OD of the light-shielding photosensitive layer was 1.5 (as determined by a Macbeth densitometer).

Also, coating solutions for colored red, green and blue photosensitive layers each having the composition shown in Table 1 of Example 1 were prepared.

Using these materials, a R, G and B color filter was formed on a glass substrate (thickness: 1.1 mm). In this example, the heat treatment was conducted for each color layer at 220° C. for 20 minutes to completely harden each picture element. The i-ray and h-ray transmittances of the resulting picture elements for the respective colors are shown in Table 4.

TABLE 4

| | Transmittance (%) | |
|---|---|---|
| | i-ray | h-ray |
| R Layer | 1 | 1 |
| G Layer | 0.5 | 0.8 |
| B Layer | 0.2 | 30 |

The covering sheet of the light-shielding photo-sensitive transfer material was peeled off and the light-shielding photosensitive resin layer surface was laminated to the multicolor pattern surface comprising R, G and B picture elements using a laminator (VP-II, manufactured by Taisei Laminator Co., Ltd.) under pressure (0.8 kg/cm$^2$) and heating (130° C.). Then, the temporary support and the thermoplastic resin layer were peeled apart at the interface therebetween to remove the temporary support.

Thereafter, the laminate was subjected to back exposure from the side opposite the color filter surface using an extra-high pressure mercury lamp. In this case, because the h-ray transmittance of the B picture element exceeded 2% as shown in Table 4, the exposure was carried out through a Toshiba Glass Filter (UVD36c) placed between the light source and the sample at an exposure intensity of 100 mj/cm$^2$. Then, the laminate was developed with an aqueous solution of 1% sodium carbonate to remove the unexposed portions and to form light-shielding elements between the respective R, G and B picture elements. The finished color filter had good flatness and was free of superposition of the light-shielding layer on the R, G or B picture elements.

EXAMPLE 45

A coating solution comprising the following Formulation H2 was coated on a 100 μm-thick polyethylene terephthalate film as a temporary support and dried to form a thermoplastic resin layer having a dry thickness of 20 μm: Formulation H2 for Thermoplastic Resin Layer:

| | |
|---|---|
| Methyl methacrylate/2-ethyl-hexyl acrylate/benzyl methacrylate/methacrylic acid copolymer (copolymer composition ratio (by mol) = 55/28.8/11.7/4.5; weight average molecular weight = 80,000) | 15.0 parts by weight |
| BPE-500 (polyfunctional acrylate, produced by Shin Nakamura Chemical Co., Ltd.) | 7.0 parts by weight |
| F177P (fluorine-based surface active agent, produced by Dainippon Ink & Chemicals, Inc.) | 0.3 part by weight |
| Methanol | 30.0 parts by weight |
| Methyl ethyl ketone | 19.0 parts by weight |
| 1-Methoxy-2-propanol | 10.0 parts by weight |

Thereafter, a coating solution comprising the following Formulation B2 was coated on the above described thermoplastic resin layer, and dried to form an interlayer having a dry thickness of 1.6 μm. Formulation B2 for Interlayer:

| Polyvinyl alcohol (PVA205, produced by Kuraray Co., Ltd.; saponification rate = 80%) | 130 parts by weight |
| Polyvinyl pyrrolidone (PVP, K-90, produced by GAF Corporation) | 60 parts by weight |
| Distilled water | 2,110 parts by weight |
| Methanol | 1,750 parts by weight |

On the temporary support having thereon the thermoplastic resin layer and the interlayer provided as described above, a coating solution comprising the following Formulation C3 was coated and dried to form a light-shielding photosensitive resin layer having a dry thickness of 2 μm. Furthermore, a polypropylene covering sheet (thickness: 12 μm) was attached under pressure onto the light-shielding photosensitive resin layer to prepare a light-shielding photosensitive transfer material of Example 45. Formulation C3:

| Benzyl methacrylate/ methacrylic acid copolymer (molar ratio = 70/30; limiting viscosity number [η] = 0.12) | 10.06 parts by weight |
| Pentaerythritol hexaacrylate | 10.60 parts by weight |
| 2,4-Bis(trichloromethyl)-6-[4-(N,N-diethoxycarbomethyl)-3-bromophenyl]-S-triazine | 0.52 part by weight |
| Pigment Red 177 | 4.00 parts by weight |
| Pigment Blue 15:6 | 2.86 parts by weight |
| Pigment Yellow 139 | 2.27 parts by weight |
| Pigment Violet 23 | 0.39 part by weight |
| Carbon black | 1.70 parts by weight |
| Hydroquinone monomethyl ether | 0.01 part by weight |
| F177P (surface active agent, produced by Dai-nippon Ink & Chemicals, Inc.) | 0.07 part by weight |
| Methyl cellosolve acetate | 40.00 parts by weight |
| Methyl ethyl ketone | 125.0 parts by weight |

The same steps as in Example 1 were repeated except for transferring the light-shielding photosensitive resin layer obtained above onto the color filter formed in Example 1. As a result, a color filter having the same superior properties as in Example 1 was obtained.

Synthetic examples of the compound represented by formula (I) are given below.

SYNTHETIC EXAMPLE 1 (Synthesis of Compound 1)

21.1 Parts of 3-phenyl-7-[(6-chloro-4-diethylamino-s-triazine-2-yl)amino]coumarin and 14.2 parts of N-butylamino-4-butanol were added to 20 parts of tetrahydrofuran and reacted for 6 hours under reflux. The reaction product was poured into water, and the crystals thus precipitated were collected by filtration. The product was recrystallized from a mixed solvent of chloroform:ethyl acetate (1:1 by volume) to obtain 20 parts of 3-phenyl-7-[[6-(4-hydroxybutylbutylamino)-4-diethylamino-s-triazine-2-yl]amino]coumarin. The resulting compound had a melting point of from 124° to 126° C.

SYNTHESIS EXAMPLE 2 (Synthesis of Compound 5)

21.1 Parts of 3-phenyl-7-[(6-chloro-4-diethylamino-s-triazine-2-yl)amino]coumarin and 2.7 parts of 3-hydroxymethylpiperidine were added to 20 parts of tetrahydrofuran and reacted for 3 hours under reflux. The reaction product was poured into water, and the crystals thus precipitated were collected by filtration. The product was recrystallized from ethyl acetate to obtain 22.2 parts of 3-phenyl-7-[[(6-(3-hydroxymethylpiperidino)-4-diethylamino-s-triazine-2-yl]amino]coumarin. The resulting compound had a melting point of from 182° to 183° C.

According to the present invention, a photosensitive resin layer having a light-shielding property is transferred onto a multicolor pattern. The photosensitive layer is subjected to back exposure so that the light-shielding resin layer present on the picture element is not substantially hardened. As a result, a color filter having excellent flatness is easily obtained.

While the invention has been described in detail and with reference to specific embodiments thereof, it will be apparent to one skilled in the art that various changes and modifications can be made therein without departing from the spirit and scope thereof.

What is claimed is:

1. A method for forming a color filter comprising the steps of:

providing a transparent substrate having a frontside and a backside, said frontside having thereon a multicolored pattern comprising areas having colored picture elements and areas that are free of said colored picture elements;

forming a light-shielding photosensitive resin layer on said transparent substrate to thereby cover said multicolor pattern;

exposing said light-shielding photosensitive resin layer to actinic rays through the backside of said transparent substrate, to thereby harden those portions of the light-shielding photosensitive resin layer which do not overlay the colored picture elements; and developing said light-shielding photosensitive resin layer to form light-shielding picture elements on those areas of the substrate which do not have said colored picture elements, wherein the colored picture elements of said multicolored pattern contain a compound represented by formula (I):

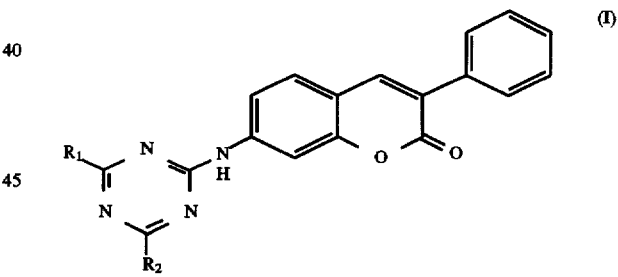

wherein $R_1$ represents an amino group substituted by at least one hydroxyalkyl group or $R_1$ represents a group represented by the following formula (II):

wherein $R_3$ represents an alkylene group; $R_4$ represents a hydrogen atom, an alkyl group, an aralkyl group, an aryl group, an alkoxyalkyl group, an aralkyloxyalkyl group, an aryloxyalkyl group or a group represented by the formula HO—$R_3$—, and $R_3$ and $R_4$ may form a 5- or 6-membered heterocyclic ring including the nitrogen atom shown in formula (II); and $R_2$ represents a hydrogen atom, an alkyl group, an aralkyl group, an aryl group, an alkoxy group, an aralkyloxy group, an aryloxy group, a halogen atom, an amino group or a substituent represented by $R_1$, and when $R_2$ is an amino group substituted by at least one hydroxyalkyl group represented by $R_1$. $R_1$ and $R_2$ are the same or different.

2. The method for forming a color filter as claimed in claim 1, wherein said amino group represented by $R_1$ further contains an alkyl group, an aryl group, an alkoxy group or an aryloxy group.

3. The method for forming a color filter as claimed in claim 1, wherein $R_3$ represents a substituted alkylene group.

4. The method for forming a color filter as claimed in claim 1, wherein said colored picture elements have a light transmittance of not more than 2% in the wavelength region to which said light-shielding photosensitive resin layer is sensitive.

5. The method for forming a color filter as claimed in claim 1, wherein said forming step comprises transferring the light-shielding photosensitive resin layer from a temporary support onto the transparent substrate.

6. The method for forming a color filter as claimed in claim 1, wherein said colored picture elements comprise blue colored picture elements, red colored picture elements and green colored picture elements.

7. The method for forming a color filter as claimed in claim 1, wherein said actinic rays radiate from an actinic ray source, and said exposing step comprises interposing a light filter between the actinic ray source and the backside of the transparent substrate.

* * * * *